United States Patent
Motte Dit Falisse

(10) Patent No.: US 7,441,621 B2
(45) Date of Patent: Oct. 28, 2008

(54) MEMBER FOR FIXING A BICYCLE DRIVING DEVICE

(75) Inventor: Gilles Jacques Abel Marie Motte Dit Falisse, rue de Boncelles, 794a, Ougrée (BE) 4012

(73) Assignee: Gilles Jacques Abel Marie Motte Dit Falisse, Ougrée (BE)

(*) Notice: Subject to any disclaimer, the term of this patent is extended or adjusted under 35 U.S.C. 154(b) by 0 days.

(21) Appl. No.: 10/526,542

(22) PCT Filed: Sep. 11, 2003

(86) PCT No.: PCT/BE03/00150

§ 371 (c)(1),
(2), (4) Date: Mar. 3, 2005

(87) PCT Pub. No.: WO2004/024549

PCT Pub. Date: Mar. 25, 2004

(65) Prior Publication Data

US 2005/0269146 A1    Dec. 8, 2005

(30) Foreign Application Priority Data

Sep. 12, 2002    (EP) ................... 02447175

(51) Int. Cl.
*B62M 13/04*    (2006.01)
(52) U.S. Cl. .................. 180/205; 180/220; 180/221
(58) Field of Classification Search ................. 180/220, 180/221, 205, 65.2, 342; 280/214; 74/526, 74/527, 551.1, 594.3
See application file for complete search history.

(56) References Cited

U.S. PATENT DOCUMENTS

| | | | | | |
|---|---|---|---|---|---|
| 3,961,678 | A | * | 6/1976 | Hirano et al. | 180/221 |
| 3,978,936 | A | * | 9/1976 | Schwartz | 180/222 |
| 4,172,504 | A | * | 10/1979 | Muto | 180/221 |
| 4,418,784 | A | * | 12/1983 | Fox | 180/221 |
| 4,579,188 | A | * | 4/1986 | Facer | 180/211 |
| 5,423,393 | A | * | 6/1995 | Felt | 180/221 |
| 5,491,390 | A | * | 2/1996 | McGreen | 180/221 |
| 5,671,821 | A | | 9/1997 | McGreen | |
| 5,799,747 | A | * | 9/1998 | Olsen | 180/221 |
| 6,102,148 | A | * | 8/2000 | Chien | 180/220 |
| 6,192,773 | B1 | | 2/2001 | Liao | |
| 6,497,299 | B1 | * | 12/2002 | Sinclair et al. | 180/205 |

FOREIGN PATENT DOCUMENTS

| | | |
|---|---|---|
| CH | 685 757 | 9/1995 |
| DE | 299 21 956 | 3/2000 |
| DE | 201 02 265 | 5/2001 |
| EP | 155 185 | 9/1985 |
| EP | 644 110 | 3/1995 |
| EP | 1 031 505 | 8/2000 |
| FR | 2 346 178 | 10/1977 |

* cited by examiner

*Primary Examiner*—Anne Marie Boehler

(57) ABSTRACT

The invention concerns a member for fixing (1) a bicycle wheel friction drive device comprising a first part (2) linked to said driving device (3), so as to be pivotable about a first pivot pin (4), and a second part (5) attached to the first part (2), so as to enable mutual pivoting between them about a second pivot pin (6), said second part (5) including a fastener (7) located at a predetermined distance from said second pivot pin (6), said fixing member (1) further comprising adjusting means designed to fix in an adjustable angular position the first part (2) relative to the second part (5).

9 Claims, 2 Drawing Sheets

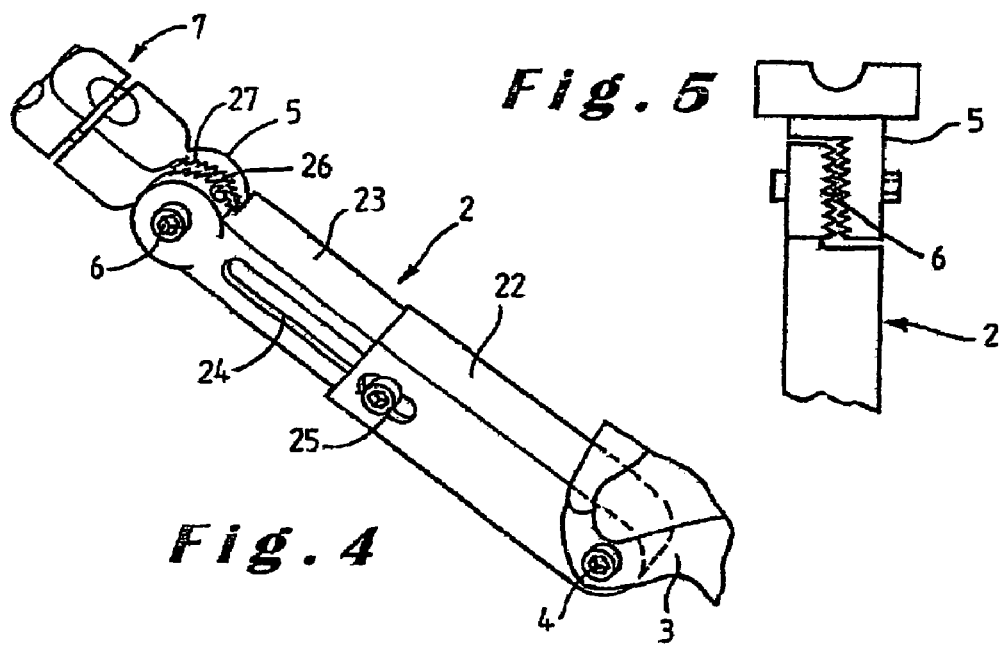
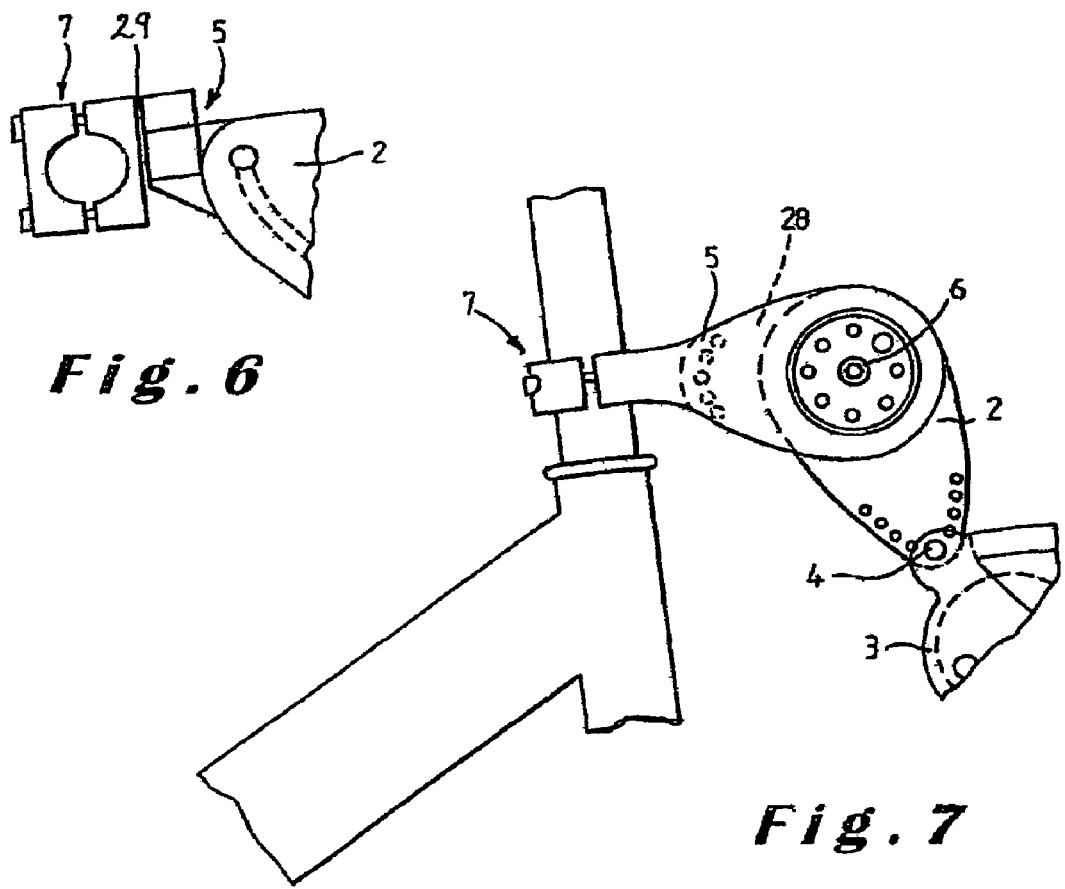

MEMBER FOR FIXING A BICYCLE DRIVING DEVICE

BACKGROUND OF THE INVENTION

The present invention relates to a universal fixing member for a device for driving of a bicycle wheel.

Driving systems for bicycles offer assistance for pedalling by means of an additional motor. This assistance generally consists of a drive mechanism arranged on one of the wheels of the bicycle. Thus the power of the motor drives the wheel and is added to the power exerted by the pressure on the pedals, which enables the cyclist to supply less effort.

Unlike the drive system illustrated in European Patent application EP-A-0.155.185, in addition to the familiar drive system the new invention introduces a technological innovation as regards the fixing of the drive device. The fixing member of the drive device comprises a single mounting connecting this element either, in the case of a bicycle, to the seat post or to the handlebars, or to the frames of another non-motorised vehicle. The said system is thus different since rather than being fixed permanently or in a non-adjustable manner to the frame of a non-motorised vehicle, this case provides a truly universe system.

SUMMARY OF THE INVENTION

The aim of the present invention is therefore to propose a member for fixing a device for driving a bicycle wheel, adapting easily to each type of vehicle.

This aim is achieved by this member for fixing a device for driving, comprising
- a single fastener (7) connected either to the handlebars or the foot of the saddle, or to the frame of any bicycle or vehicle to be powered
- the drive device being arranged so as to be able to pivot freely about an axis of the pivot (4), this fixing member also comprising
- a first part (2), to which the drive device is connected so as to be able to pivot freely about the said axis of the pivot (4),
- a second part (5), which is connected to the first part so as to allow mutual adjusting between them together using two locking screws (19), the latter thus not being involved in the rotation of the power unit towards the wheel to be driven Thus the drive device does not pivot directly with respect to the bicycle frame or to a part fixed with respect to this frame, but on the contrary with respect to an intermediate piece, referred to as the first part of the fixing member, whose angular position with respect to the second part can be adjusted in advance.

In conclusion, the drive device comprises both a preliminary adjustment system for a given vehicle and a system for putting it in contact with the wheel to be driven.

The invention can be executed in at least three possible forms, namely:
  For the first (FIG. 1), a sliding axle (19) in two curved slots (17) allowing widely variable adjustment of the two components of the universal arm (2) and (5) to a given angle.
  For the second (FIG. 7), adjustment in fixed steps, determined by a series of holes arranged in an arc of a circle allowing a finite number of settings which are however more suitable for severe conditions.
  For the third (FIG. 4), adjustment using a kneepiece for which the connection between parts (26) and (27) is executed using notches to be screw-fastened (6), supplemented by an extension comprising two elements of which one slides into the other and is set using a tightening pivot (25) which, as appropriate, will slide into the slots (24) or lodge in one of the locating holes which could be used instead of the slots referred to above.

Other embodiments of modular structures according to the invention are indicated in the accompanying claims. In addition, other details and particularities of the invention will emerge from the description given below, non-limitingly and with reference to the accompanying drawings.

BRIEF DESCRIPTION OF THE DRAWINGS

In the drawings:

FIG. 4 is a perspective view of the first and second parts of a variant fixing member according to the invention.

FIG. 5 is a plan view of the connection between the two parts of the fixing member according to FIG. 4.

FIG. 6 depicts a side view of a detail of the construction of a variant second part of the fixing member.

FIG. 7 is a side view of yet another variant fixing member according to the invention.

DETAILED DESCRIPTION OF THE INVENTION

Figure 3:
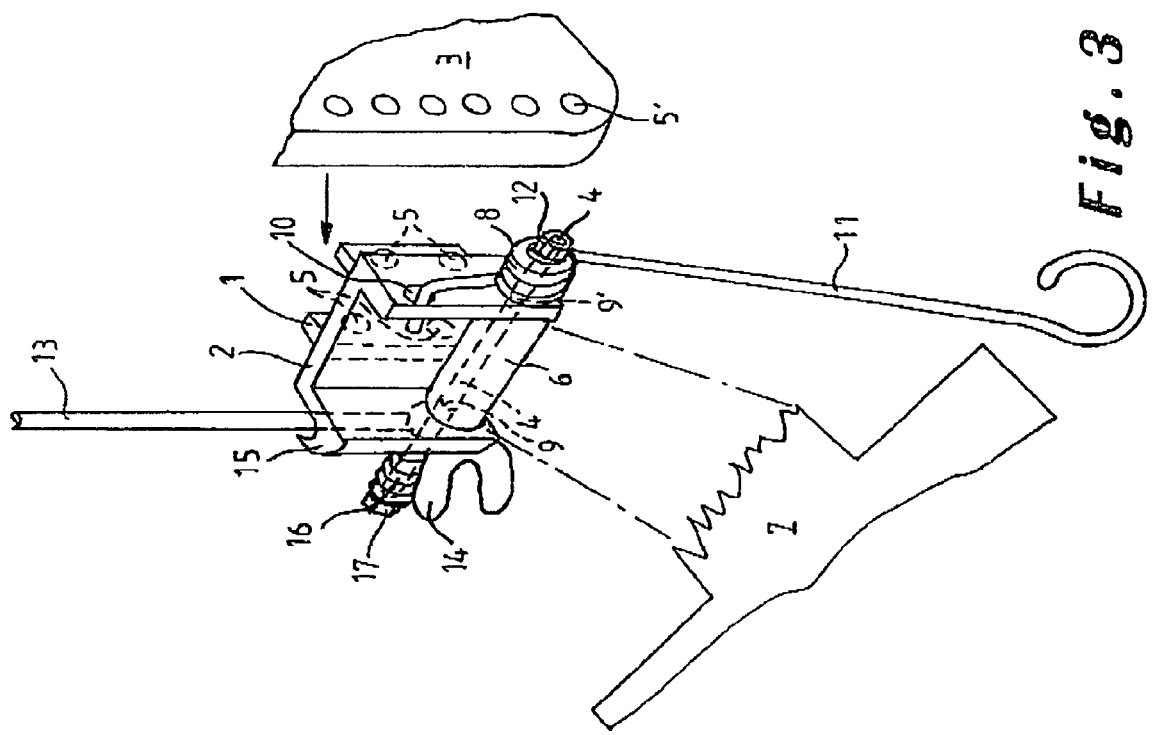
FIG. 3 illustrates, in a side view, the fixing member according to FIG. 2 fixed to a second type of bicycle.

In the drawings, the same reference number has been allocated to the same element or to a similar element.

Figure 1:
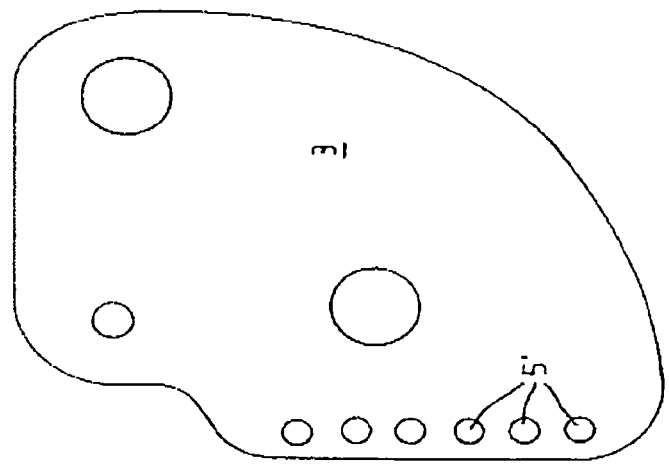
FIG. 1 is a schematic perspective view of an embodiment of a fixing member according to the invention.

If reference is made to FIG. 1, the fixing member (1) comprises a first part (2) connected to the drive device (3) so as to be able to pivot about an axis of the pivot (4). In addition, a second part (5) is attached to the first part (2), so as to allow their mutual adjusting about an adjusting and locking pivot (6). The second part also comprises a fastener (7) situated at a predetermined distance from adjusting and locking pivot (6).

This fastener (7) can comprise, for example, two blocks (8), the first block comprising a concave face (9) placed facing the concave face of the second block, and these blocks being connected by fixing means such as, for example, clamping screws (10). One of the blocks can be integral with the second part of the fixing member.

In order to fix the fastener to a part of the handlebars, the operator can unscrew the clamping screws so as to separate the two blocks and place the block integral with the second part against the part of the bicycle to which the fixing member is fixed. Next, the operator can place the other block opposite and screw the clamping screws so as to fix the two blocks around the part of the handlebars. Likewise, the form of the sides of the blocks coming into constant with the bicycle can vary so as best to follow the circumferences of the place to which the fastener will be fixed.

It can also be imagined that the fastener can itself be connected detachably to the second part 5 of the fixing member. It can also be conceived, for example, that, as illustrated in FIG. 6, the fastener be supported on the second part 5 by a pivot 29 for adapting the position of the fastener in the most appropriate fashion to the frame element to which the fixing member must be attached. In the embodiment illustrated, the pivot 29 is formed by one of the clamping bolts of the fastener 7.

Figure 2:
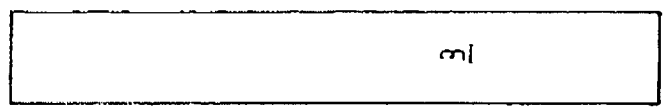
FIG. 2 illustrates, in a side view, a fixing member according to the invention fixed to a first type of bicycle.

In the embodiment illustrated in FIGS. 1 to 3, the drive device is composed of a motor (21), for example electric, connected to a drive wheel by a transmission means, not shown, such as a chain or belt, the drive wheel acting on the tyre by communicating its movement to it.

In addition, the first part (2) of the fixing member can comprise a series of holes (12) close to the drive device. These holes represent various pivot seats or the swinging mounting, and for a system described in detail in patent EP 1593593. They allow an additional adjustment for the placing of the drive device. This is because these holes make it possible to modify the location of the axis of the pivot (4) so that the driving device can be positioned optimally.

The fixing member can also be provided with a normal elastic means, not shown, which, with a certain degree of freedom, forces the drive device to remain essentially in contact with the wheel.

In addition, in FIGS. 1 to 3, the fixing member also comprises adjustment means (16) which comprise, on one of the parts of the fixing member, for example on the second part (5), at least one first orifice (17) extending in an arc of curvature having as its centre the adjusting and locking pivot (6) and a second orifice 18, for example situated on the first part 2 of the fixing member. In addition, a holding and clamping means is arranged so as to engage in the first orifice (17) and in the second orifice (18) in order thus to keep the two parts integral with each other, after clamping. In this case, the holding means (19) comprise a screw, a brace, two washers, and a self-locking nut.

As illustrated in FIGS. 2 and 3, the fixing member can adapt to various configurations. Thus, as depicted in FIG. 2, the fixing member makes it possible to attach the drive device to any form of handlebars or seat post of a bicycle or on part of the frame of another vehicle. It is also possible, as depicted in FIG. 3, to attach the fixing member onto handlebars, regardless of their configuration.

So as to adjust the pivot angle of the first part with respect to the second, the user makes the second part (5) and the first part (2) of the fixing member pivot mutually about the adjusting and locking pivot (6). Next, in the appropriate angular position, the fixing means (19), in this case a nut and a screw, are tightened in such a way that the first part is pressed against the second, thus fixing them solidly.

In addition, the drive device can comprise a shell provided with a luggage holder (20), the luggage holder preferably being arranged so as to carry a bag deposited so as to straddle the luggage holder. The bag can comprise also two locations, each arranged to contain for example batteries supplying the motor of the drive device. When the bag is placed straddling the luggage holder, the batteries will be placed so as to balance the weight on each side of the drive device.

In the example embodiment illustrated in FIG. 4, the first part (2), also consists of two pieces (22) and (23) sliding with respect to each other. The first piece 22 is hollow and supports either the drive device (3), or the patent EP 1593593 enabling it to pivot about the axis (4). The second piece (23) slides inside the first piece (22) and is connected to the second part (5) so as to allow mutual adjusting. Through the elongate slots (24) of the second piece (23), a clamping screw (25) supported by the first piece (22) can be passed and tightened. When the separation between the axis of pivot (4) and the adjusting and locking pivot (6) is appropriate, the screw (25) can be tightened in order to lock the two pieces in this position.

The first part (2) has at one end a circular serration (26) whose centre is formed by the adjusting and locking pivot (6). Likewise the same part (5) has a corresponding serration (27) whose centre is also formed by the adjusting and locking pivot (6). When the two parts (2) and (5) have acquired their appropriate angular position a clamping bolt passing through the adjusting and locking pivot (6) is tightened and the serrations engages in each other and cooperate so as to lock the two parts together.

FIG. 7 also depicts another embodiment of a fixing member. Around the pivot pin 6, each of the parts has orifices which extend in equal arcs of a circle concentric with the pin. It is thus possible, by means of a clamping a blot, to fix eh mutual angular positions of the two parts of the fixing member.

It must be understood that the present invention is in no way limited to the embodiments described above and that many modifications can be made thereto without departing from the scope of the accompanying claims.

It is possible in particular to imagine, between the first part and the second part of the device, a combination, not illustrated, of a first part (2), of the telescopic type similar to that illustrated in FIG. 4, and a second part (5) with rotary adjustment similar to that illustrated in FIG. 7.

It is also possible to conceive, as illustrated in broken lines in FIG. 7, an embodiment of the second part (5) where the fastener (7) supports an intermediate element (28) in an angularly adjustable manner.

The invention claimed is:

1. A member (1) for fixing a device for driving a bicycle wheel by friction, comprising
    a fastener (7) connected to an element of the bicycle frame,
    the friction drive device (3) being arranged so as to be able to pivot freely about a first pivot pin (4), characterised in that the fixing member also comprises
    a first part (2), to which the drive device is connected so as to be able to pivot freely about the said first pivot pin (4),
    a second part (5), which is connected to the first part (2) so as to allow mutual pivoting between the first part (2) and the second part (5) about a second pivot pin (6) before clamping and keeping them integral with each other, and the second part (5) comprises the said fastener (7), at a distance from the said second pivot pin,
    adjustment means (17-19:26-27) capable of detachably fixing the first part (2) with respect to the second part (5) in an angular position adjustable by the said mutual pivoting so that after the adjustment the first part (2) is fixed with respect to the second part (5), and
    means (22-25) of modifying the separation between the first pivot pin (4) and the second pivot pin (6), and therefore adjusting the length between the fastener and the drive device so as to place the drive wheel on the bicycle tyre according to the bicycle configuration.

2. The fixing member according to claim 1, characterised in that the first pivot pin (4) is situated at a distance from the second pivot pin (6).

3. The fixing member according to claim 1, characterised in that the first part (2) comprises two pieces (22, 23) capable of sliding with respect to each other, one (22) of the two pieces supporting the drive device (3) so as to enable the latter to pivot about the first pivot pin (4), the other one (23) of the two pieces being connected to the second part (5) so as to allow the said mutual pivoting.

4. The fixing member according to claim 1, characterised in that it comprises at least one stop (13) arranged so as to delimit an angle of movement between the said drive device and the said first part.

5. The fixing member according to claim 1, characterised in that the said adjustment means comprise, on one of the parts of the fixing member at least a first orifice (17) extending in an arc of curvature having the second pivot pin (6) as its centre, and, on the other part, a second orifice (18) situated facing at least one of the said at least one first orifice (17), as well as holding and clamping means (19) arranged so as to engage in the said at least one first orifice (17) and the said second orifice (18) and thus to keep the two said parts integral with each other, after clamping.

6. The fixing member according to claim 1, characterised in that the said adjustment means comprise, on one of the parts of the fixing member, a first serration (26) extending in a first arc of curvature having the second pivot pin (6) as its centre and, on the other part, a second serration (27) capable of cooperating with the first and extending in a second arc of curvature having the second pivot pin (6) as its centre as well as means of clamping the two parts with their respective serrations mutually engaged.

7. The fixing member according to claim 1, characterised in that the said drive device (3) comprises a motor (21) arranged so as to drive in rotation a drive wheel (11) able to act by friction on the bicycle wheel.

8. The fixing member according to claim 1, characterised in that the first part (2) has several pivot seats (12) for adjusting the position of the first pivot pin (4) as required.

9. The fixing member according to claim 1, characterised in that, in the second part (5), the said fastener (7) supports an intermediate element (28) in an angularly adjustable manner.

\* \* \* \* \*